No. 12,587. REISSUED JAN. 8, 1907.
M. A. GARRETT.
DRAFT AND BUFFING GEAR OR RIGGING FOR CARS.
APPLICATION FILED OCT. 30, 1905.
2 SHEETS—SHEET 1.
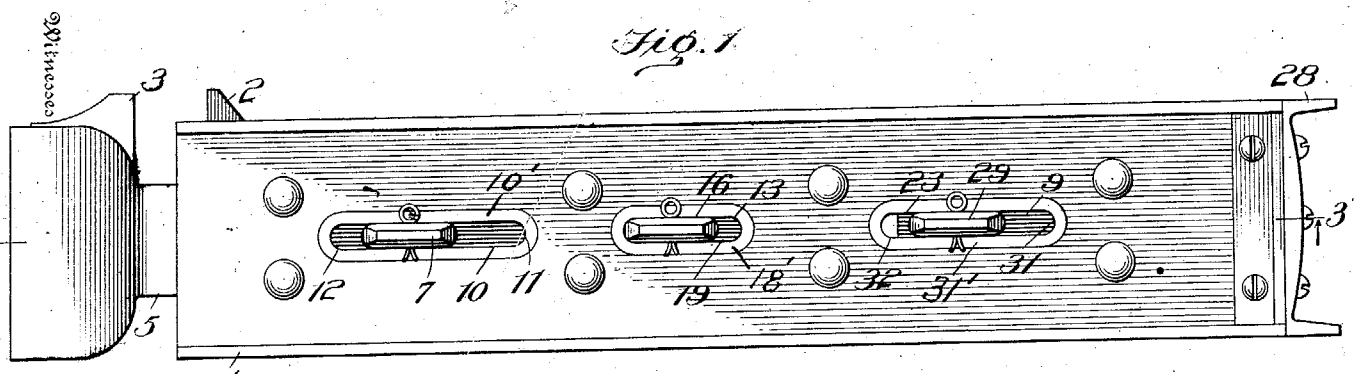
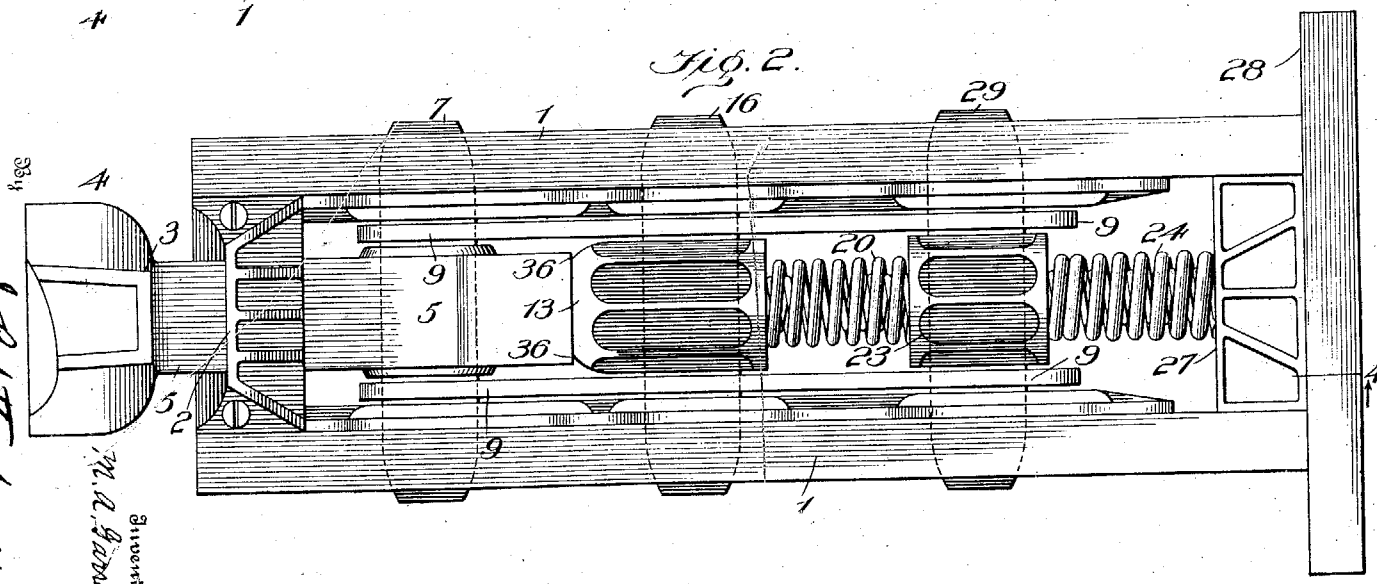
Witnesses
Edwin L. Bradford
P. H. Burch
Inventor
M. A. Garrett
By
J. R. Nottingham
Attorney No. 12,587. REISSUED JAN. 8, 1907.

M. A. GARRETT.

DRAFT AND BUFFING GEAR OR RIGGING FOR CARS.

APPLICATION FILED OCT. 30, 1905.

2 SHEETS—SHEET 2.

Witnesses

Edwin L. Bradford

P. H. Burch

Inventor

M. A. Garrett

By J. R. Nottingham

Attorney

UNITED STATES PATENT OFFICE.

MYERS A. GARRETT, OF CHICAGO, ILLINOIS, ASSIGNOR TO FARLOW DRAFT GEAR COMPANY, OF BALTIMORE, MARYLAND.

DRAFT AND BUFFING GEAR OR RIGGING FOR CARS.

No. 12,587. Specification of Reissued Letters Patent. Reissued Jan. 8, 1907.

Original No. 781,877, dated February 7, 1905. Application for reissue filed October 30, 1905. Serial No. 285,225.

*To all whom it may concern:*

Be it known that I, MYERS A. GARRETT, a citizen of the United States, residing at Chicago, in the county of Cook and State of Illinois, have invented certain new and useful Improvements in Draft and Buffing Gears or Riggings for Cars, of which the following is a specification.

The present invention relates to the means for transmitting the endwise movements of the draw-bar to the car structure and at the same time relieving the latter of the sudden and many-timed violent shocks that are incident to draw-bar concussion. Its objects and the novel features in which it consists are hereinafter fully described with reference to the accompanying drawings, which are made a part of this specification, and in which—

Figure 3:
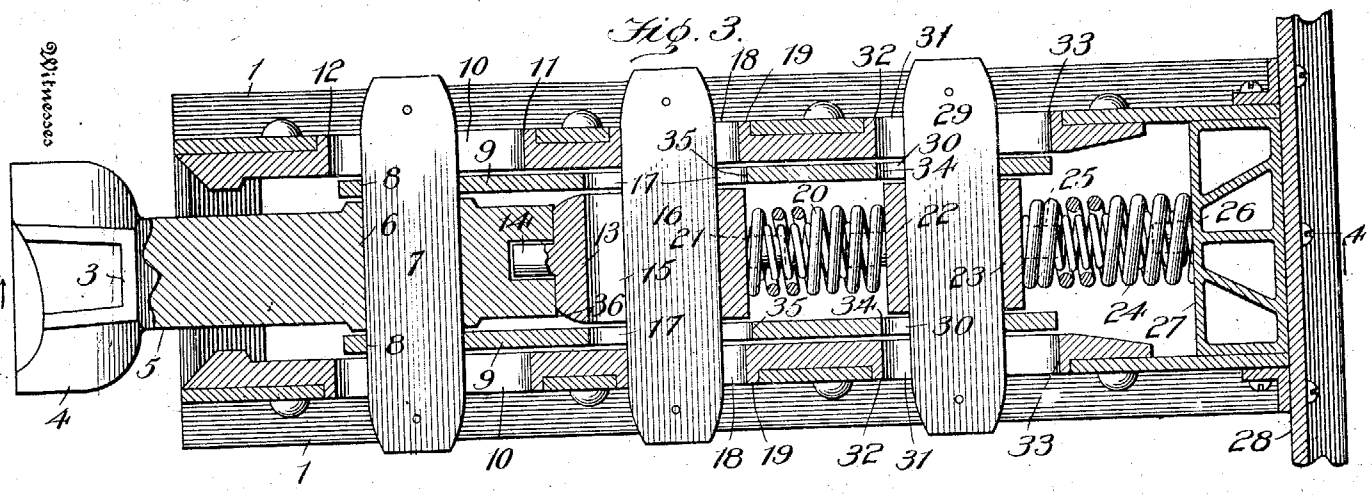
Figure 4:
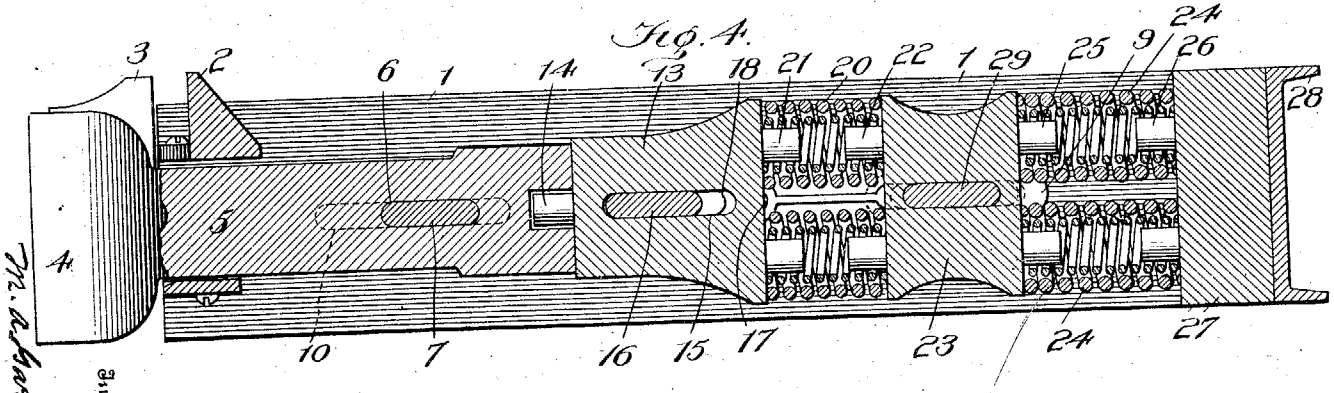

Figures 1, 2, and 3 are respectively a side elevation, a plan view, and a horizontal section of a draft and buffing gear embodying my invention, the parts being shown in normal positions; and Fig. 4 is a vertical longitudinal section thereof with the parts in the positions which they occupy when the draw-bar is under a buffing strain and before it reaches the limit of its inward movement.

The draft-arms 1 carry at their outer ends a buffer-block 2, which is adapted to be engaged by a horn 3 on the head 4 of the draw-bar 5. The distance between the block and the horn represents the maximum inward movement of the draw-bar, and the block is one of a number of stops, others being described hereinafter, for arresting the inward movement of the draw-bar and throwing directly onto the draft-arms the buffing strains in excess of those taken up by the buffing-cushion. The draw-bar is provided with a transverse opening 6, in which fits snugly a removable key 7, which passes through similar openings 8 in the outer ends of a pair of links or bars 9, which partake of both the inward and outward movements of the draw-bar and transmit the normal drawing strains to the draft-cushion, as hereinafter described. Collectively these links are hereinafter termed the "draw-bar extension." The key passes also through elongated slots 10 in the draft-arms, said slots being surrounded by bosses or flanges 10′. The length of these slots and their locations with relation to the key when in normal position are such that the shoulders 11, provided by their inner ends, form stops for limiting the inward movement of the key, (and consequently the draw-bar,) and the shoulders 12, provided by their outer ends, form stops for limiting the outward movement of the key, (and consequently the draw-bar,) the clearance or distance between the key and the stops 11 and 12 representing the maximum inward and outward movement, respectively, of the draw-bar. It will be observed that these distances vary. The reason for this is that the proper cushioning of the draw-bar under drawing strains can be accomplished in a short space and with less cushion capacity than is required to cushion it under buffing strains and shocks. The provision for this unequal movement of the draw-bar and the arrangement of stops at unequal distances from the normal position of a part carried by the draw-bar and adapted to contact with them when used in connection with a cushion of one capacity for absorbing the drawing strains and a cushion of greater capacity for absorbing the buffing strains constitutes one feature of the present invention.

At the inner end of the draw-bar is a block 13, which has on its outer face a stud 14, occupying a socket in the end of the draw-bar, the stud and socket being of sufficient length to prevent their disengagement when the draw-bar moves outward, leaving the block behind. All draw-bar strains, both drawing and buffing, that are put upon the cushions (by "cushions" I mean the springs or other devices which absorb the buffing and drawing strains) and some of the excess strains that are put directly upon the draft-arms are transmitted through this block, and by eliminating the stops 2, 11, and 12 and certain other stops hereinafter described all strains would be transmitted through it. In transmitting drawing strains it has the function of a fixed abutment for the primary cushion, while in transmitting buffing strains it has the function of a follower or draw-bar extension interposed directly between the draw-bar and the primary cushion, hereinafter described. It may appropriately be called a "follower" or an "abutment," accordingly as one or the other of its two functions is contemplated. For the sake of brevity it will be called a "block," but with the understanding that this term is used for want of a better one and without implying any limitation as to shape, any part or parts, of whatever shape, that will perform the described functions, being within the scope of the invention. The block 13 has an elongated slot 15, through which passes a pin 16, having the function of a crosstree, which passes also through elongated slots 17 and 18 in the sides of the draw-bar extension and draft-arms, respectively, the slots 18 being surrounded by bosses or flange 18'. Normally the inner side of the crosstree contacts with the block at the inner end of the slot 15, and the outer side of the crosstree contacts with the draft-arms at the outer ends of the slots 18, so that the block and tree are prevented from moving outward from their normal positions, and the outward or drawing strains put upon the block are transmitted through the crosstree to the draft-arms. The slots 15 and 18 are of such length that the aggregate of clearance or spaces between the crosstree and the block and draft-arms represents the maximum inward movement of draw-bar. This clearance, without affecting the operation of the device, might be all in the block, in which case the crosstree would be immovable, or all in the draft-arms, in which case the crosstree and block would be immovable relatively to each other. In either case the shoulders 19 at the inner ends of the slots 18 form stops for assisting in limiting the inward movement of the draw-bar.

The term "cushion" as used in this specification is intended to comprehend any elastic or resilient substance or device of whatever construction that is adapted to receive the draw-bar strains and absorb or deaden more or less of the shocks and concussions, and thus relieve the car structure. Various substances and devices have been used for this purpose, examples of which are blocks of rubber, metallic springs of various construction arranged in various ways, and friction devices having springs as elements in their construction. In carrying out the present invention coiled metal springs are preferred, and at 20 a group of nested springs, herein called the "primary cushion," is shown. Each nest projects at its outer end over a stud 21 on the block 13 and at its inner end over a stud 22 on a part 23, hereinafter called a "follower." This follower is movable in both directions from its normal position, so that it partakes of both the inward and outward movement of the draw-bar. At 24 a second group of nested springs, hereinafter called the "secondary cushion," is shown. Each nest projects at its outer end over a stud 25 on the follower 23 and at its inner end over a stud 26 on a block 27, fixed to the front side of the transom 28 and forming a fixed abutment. The terms "primary" and "secondary" are used only for the sake of distinction, and not with the intention of implying any limitation that is not otherwise expressed. They are appropriate, because while the so-called "secondary cushion" takes no part in the drawing action, still in the buffing action the strains first fall upon the so-called "primary cushion" and are transmitted through it to the follower 23 and thence to and through the secondary cushion to the transom. Thus the draft-arms are entirely relieved of all buffing strains excepting those that are in excess of the capacity of the cushions and fall upon the stops 2, 11, 19, and 33. The secondary cushion is preferably more powerful than the primary cushion, and this is for the double purpose of providing a powerful reserve for the more violent buffing shocks and at the same time enabling the use of a comparatively weak primary cushion for taking up the drawing shocks and easing the buffing shocks to the secondary cushion. A plurality of cushions which are successively called into action, each acting independently of the other, should not be confounded with a plurality of cushions each of which transmits its load to the next in succession, especially if the primary cushion, or the one which receives the shocks initially, is the weaker.

For transmitting the drawing strains to the primary cushion without the intervention of the secondary cushion the follower 23 is provided with an opening in which fits snugly, but so as to be removable, a pin 29, which has the function of a crosstree. This pin passes also through elongated slots 30 and 31, formed through the sides of the draw-bar extension and through the draft-arms, respectively, the slots 31 being surrounded by bosses or flanges 31'. The slots 30 are of such length and so located that normally the inner side of the crosstree 29 contacts with the sides of the draw-bar extension at the rear ends of the slots 30, so that as the draw-bar extension moves outward the crosstree is moved with it, and this movement is transmitted through the follower to the primary cushion. The slots 31 are of sufficient length to permit this movement and so located that at its completion the crosstree 29 will be in contact with stops 32. The slots 30 provide sufficient clearance at the outer side of the crosstree 29 to permit the draw-bar extension to move inward independently of the crosstree to the full extent of the desired compression of the primary cushion, and sufficient clearance is provided by the slots 31 at the inner side of the crosstree to permit it to move inward to the full extent of the desired compression of the secondary cushion.

The operation of the improved gear is as follows: The initial inward movement of the draw-bar carries with it the draw-bar extension 9 and the block 13 and compresses the primary cushion to a greater or less extent, depending upon the extent of the movement. The inner end of the primary cushion acting upon the follower 23 moves it more or less in opposition to the resistance of the secondary cushion, depending upon the load put upon the primary cushion. As the inward movement of the draw-bar continues the cushions will be compressed more and more, the extent of compression being greater in the primary cushion, because of its inferior capacity. It is not desirable to compress a spring until it becomes solid from end to end, because this tends to destroy its elasticity, and hence in order to shunt, as it were, the primary cushion and transmit the buffing strains directly to the secondary cushion the shoulders 34 on the draw-bar extension are so disposed that they come in contact with the crosstree 29 when the primary cushion has been compressed to the desired extent. Thereafter the continued inward movement of the draw-bar will be transmitted by the draw-bar extension to the crosstree 29, thence to the follower 23, and thence to the secondary cushion 24. In order to prevent injurious compression of the secondary cushion, the stops 33 are so arranged that they engage the crosstree 29 when the secondary cushion has been compressed to the desired extent. The draw-bar is then at the extreme limit of its permitted movement. All additional strains tending to move it inward will be transmitted to the draft-arms at four points—viz., the buffer-block 2 and the stops 11, 19, and 33—and the cushions will be wholly relieved of any of this excess. In moving outward from its normal position, in which it is held by the counteraction of the two cushions, the initial movement will be transmitted through the draw-bar extension to the crosstree 29, thence to the follower 23, thence to the primary cushion, thence to the block 13, and thence through the crosstree 16 to the draft-arms. The secondary cushion performs no function whatever in this action. As the outer movement of the draw-bar continues the key 7 will eventually reach the stops 12, the shoulder 35 on the draw-bar extension will reach the crosstree 16, and the crosstree 29 will reach the stops 32, so that strains in excess of those that are taken up by the primary cushion are transmitted to the draft-arms without the intervention of any cushioning device.

When coupled cars are standing or running on a curved track, their draw-bars are deflected more or less from their normal positions in the central line of the car, so that an inward thrust will have a tendency to produce lateral strains on the parts. In order to lessen this tendency and centralize the impact upon the meeting faces of the block 13 and the inner end of the draw-bar as much as possible, one or the other of them (preferably the block) is rounded off, as shown at 36, and the socket in which the stud 14 fits is enlarged laterally, so that one part may rock upon the other.

What I claim as new, and desire to secure by Letters Patent, is—

1. In draft and buffing gear, the combination of a draw-bar, a block at the inner end of the draw-bar, and a movable crosstree arranged to permit the inward movement of the block and to prevent its outward movement.

2. In a draft and buffing gear, the combination of a draw-bar, a block at the inner end of the draw-bar, a movable crosstree arranged to permit the inward movement and to prevent the outward movement of the block, and a cushion arranged at the inner side of said block and adapted to receive the inward initial thrust of the draw-bar.

3. In a draft and buffing gear, the combination of a draw-bar, a block at the inner end of said draw-bar, a movable crosstree arranged to permit the inward movement and to prevent the outward movement of the block, a primary cushion arranged at the inner side of said block and adapted to receive the inward thrust of the draw-bar, a follower movable in both directions from its normal position, and a secondary cushion for resisting the inward movement of the follower.

4. In a draft and buffing gear, the combination of a draw-bar, primary and secondary cushions adapted to receive the inward thrust of the draw-bar, a movable block arranged at the inner end of said draw-bar, and a crosstree arranged to continue the inward movement after the primary cushion has been compressed a limited extent.

5. In a draft and buffing gear, the combination of a draw-bar, slotted draft-arms, slotted draw-bar extension, slotted follower-blocks, springs between said blocks, and crosstrees or keys, all of which are movable.

6. In a draft and buffing gear, the combination of a draw-bar, slotted draft-arms, a slotted draw-bar extension, slotted follower-blocks, springs between said blocks, and crosstrees or keys, the center one being movable.

7. In a draft and buffing gear, the combination of a draw-bar provided with a key, a movable block at the end of the draw-bar, said block provided with a movable crosstree, a follower-block also provided with a key, and springs between the movable block and the follower-block.

8. In a draft and buffing gear, the combination of a draw-bar, primary and secondary cushions arranged to receive the inward thrust of the draw-bar, and a follower through which said cushions react against each other under said thrust, said follower being movable in both directions from its normal position.

9. In a draft and buffing gear, the combination of a draw-bar, primary and secondary cushions, means for transmitting the inward thrust of the draw-bar to the primary cushion, a follower movable in both directions from its normal position arranged between the two cushions and adapted to transmit said inward thrust from the primary to the secondary cushion, and means for transmitting the outward movement of the draw-bar to the primary cushion.

10. In a draft and buffing gear, the combination of a draw-bar, primary and secondary cushions arranged in line with the draw-bar and adapted to receive the inward thrust, a follower movable in both directions from its normal position arranged between the cushions, a draw-bar extension for transmitting the outward movement of the draw-bar to the follower, said extension having clearance for permitting its inward movement relatively to the follower.

11. In a draft and buffing gear, the combination of a draw-bar, a primary cushion adapted to receive at its outer end the inward thrust of the draw-bar, a follower at the inner end of the primary cushion, a secondary cushion arranged to receive at its outer end the inward movement of the follower, an abutment at the inner end of the secondary cushion, and means for transmitting the outward movement of the draw-bar to the follower, the parts being provided with clearance for permitting the inward movement of the draw-bar relatively to the follower.

12. In a draft and buffing gear, the combination of a draw-bar, a primary cushion, means for transmitting the inward thrust of the draw-bar to the outer side of the primary cushion, a fixed abutment for preventing the outward movement of the primary cushion beyond its normal position, a follower movable in both directions from its normal position engaging the inner side of the primary cushion, a secondary cushion arranged to resist the inward movement of the follower, and means for transmitting the outward movement of the draw-bar to the follower.

13. In a draft and buffing gear, the combination of a draw-bar, draft timbers and plates, each having three elongated slots for the reception of movable keys, means including cushions for holding the draw-bar in normal position, and stops for arresting the inward and outward movement of the draw-bar at unequal distances from its normal position.

14. In a draft and buffing gear, the combination of a draw-bar, primary and secondary cushions, means for transmitting the inward movement of the draw-bar to both of said cushions, means for transmitting the outward movement of the draw-bar to one only of said cushions, and means for arresting the inward and outward movement of the draw-bar at unequal distances from its normal position.

15. In a draft and buffing gear, the combination of a draw-bar, a draw-bar extension carried by the draw-bar and fixed relatively thereto, primary and secondary cushions, a follower arranged between the cushions for transmitting the strains from one to the other, means for transmitting the inward movement of the draw-bar to the primary cushion, and a slotted connection between the draw-bar extension and the follower for transmitting the outward movement of the draw-bar to the follower, and permitting the inward movement of the draw-bar extension relatively to the follower.

16. In a draft and buffing gear, the combination of a draw-bar, a block at the inner end of the draw-bar, means for permitting the inward and preventing the outward movement of the block from normal position, a primary cushion arranged at the inner side of the block and adapted to receive the inward thrust of the draw-bar, a follower movable in both directions from its normal position, and adapted to receive the inward thrust of the draw-bar transmitted through the primary cushion, a secondary cushion for resisting the inward movement of the follower, and means for transmitting the outward movement of the draw-bar to the follower, substantially as described.

17. In a draft and buffing gear, the combination of draft-arms, a draw-bar, a draw-bar extension movable in both directions with the draw-bar, a slotted block at the inner end of the draw-bar, a crosstree passing through the slot of the block and supported by the draft-arms, the parts being provided with clearance for permitting the inward and preventing the outward movement of the block from its normal position, a primary cushion for resisting the inward movement of the block, a follower for receiving the inward thrust of the primary cushion, a crosstree movable with the follower, and connected to the draw-bar extension, the parts being provided with clearance for permitting the movement of the tree, in both directions from its normal position, and for permitting the inward movement of the draw-bar extension relatively to the follower, and a secondary cushion for resisting the inward movement of the follower, substantially as described.

18. In a draft and buffing gear, the combination of a draw-bar, a draw-bar extension, primary and secondary cushions, a follower arranged between the cushions, means for connecting the draw-bar extension and follower whereby the follower partakes of the outward movement of the draw-bar, the parts being provided with clearance for permitting a limited inward movement of the draw-bar independently of the follower, means for transmitting the initial inward thrust of the draw-bar to the primary cushion, and thence through the follower to the secondary cushion, and means for limiting the inward movement of the follower.

19. In a draft and buffing gear, the combination of a draw-bar, a block at the inner end of the draw-bar, and suitable cushioning devices arranged in operative relation to the draw-bar and block, said draw-bar and block having rocking engagement with each other.

20. The combination with a draft and buffing gear, constructed substantially as described, of draft timbers and plates, each having three elongated slots for the reception of movable keys, the slots in the plates being surrounded by bosses or flanges.

21. The combination in a draft and buffing gear, of a coupler and draw-bar; a front movable follower-block; a rear movable follower-block; a spring or springs between the blocks; links each having two elongated slots; keys; and slotted supports for the keys; two of said keys being adapted to move within the slots in the act of buffing, and one of the elongated slots of each link to move over a key during the act of drawing.

22. The combination in a draft and buffing gear provided with supports having slots, of a coupler and draw-bar; a front follower-block; a rear follower-block; a spring or springs between the blocks; slotted links which take the strains in drawing; and keys; all of said keys being movable within slots of the supports.

23. The combination with a draft and buffing gear, constructed substantially as described, of draft timbers and plates, each having three elongated slots for the reception of movable keys.

24. The combination in a draft and buffing gear, of supports having slots; a coupler and draw-bar; a front follower-block; a rear follower-block; slotted links; keys supporting the draw-bar and follower-blocks and located within the slots of the supports; and two springs located side by side one above the other in a vertical plane between the follower blocks.

25. The combination with a draft and buffing gear having a draw-bar, slotted supports, keys, and links which take the strains in drawing, of two follower-blocks; and two springs located side by side in a vertical plane between the follower-blocks, and said follower-blocks provided with means for engaging and holding the springs in place.

26. The combination with a draft and buffing gear, of metallic draft arms or sills having slotted webs, and slotted plates for the reception of keys, the slots in said plates being surrounded by bosses or flanges which fit within the slots of the draft arms or sills.

27. The combination with a draft and buffing gear, of flanged metallic draft arms or sills having slotted webs; plates having slots surrounded by bosses or flanges, said bosses or flanges fitting within the slots in the webs of the draft arms or sills; keys; follower-blocks; springs; a coupler and draw-bar, and means connecting the draw-bar with the keys.

28. The combination with a draft and buffing gear, of slotted supports, all of the slots being elongated; a rear follower-block having a perforation; slotted links between the supports, two of said slots being elongated; a spring or springs in front of the follower-block; a movable key passed through the rear slots in the supports, the follower-block and the rear slots in the links; a movable key located within the slots of the supports and the slots of the links in front of the spring or springs, and a draw-bar and coupler, the front ends of the links being secured to the draw-bar, and said links being movable relative to the movable key located in front of the spring or springs, in drawing.

29. The combination with a draft and buffing gear, of a draw-bar; links which take the strains in drawing; means, including springs, for holding the draw-bar in normal position; and three movable keys for arresting the inward and outward travel of the draw-bar when moved from its normal position in either direction.

30. The combination with a draft and buffing gear having slots, of a coupler and perforated draw-bar; a front follower-block having a hole; a rear follower-block; a spring or springs between the blocks; links, and keys, the front and middle keys and the front follower-block being adapted to move rearwardly during the act of buffing.

31. The combination in a draft and buffing gear, of a coupler and draw-bar; a front follower-block; a rear movable follower-block; a spring or springs between the follower-blocks; links which take the strains in drawing, each having elongated slots; keys, and slotted supports for the keys, all of said keys being adapted to move within slots, and the central elongated slots of the links adapted to move over a key during the act of drawing.

32. The combination in a draft and buffing gear, of a draw-bar and coupler; supports, each having three elongated slots; three movable keys in the slots; two slotted links which take the strains in drawing, the said slots being elongated so that the rear and middle keys may move within the slots; a front follower-block; a rear follower-block, and a spring or springs between the follower-blocks, the draw-bar being provided with a perforation within which is located a key.

33. The combination in a draft and buffing gear, of a coupler and draw-bar; a front follower-block at the rear of the end of the draw-bar; a rear follower-block; a spring or springs between the blocks; slotted supports or draft-timbers; slotted links, and keys, the central key being movable, and the slotted links transmitting motion to the rear key when the draw-bar is advanced in drawing.

34. The combination in a draft and buffing gear, of a coupler and draw-bar; slotted supports; follower-blocks; springs between the follower-blocks; slotted links, and keys supporting the links, front and rear follower-blocks and springs; the key passed through the front follower-block being movable, and said links being located between the slotted supports and the follower-blocks, and serving to transmit motion from the draw-bar to the rear key, in drawing.

35. The combination with a draft and buffing gear, of a draw-bar; springs; follower-blocks; two slotted links; slotted supports, and keys, all of which are movable; said links being located between the slotted supports and the draw-bar and spring or springs.

36. The combination in a draft and buffing gear, of slotted supports, all of the slots being elongated; follower-blocks located between the supports; a spring or springs between the follower-blocks; two slotted links located between the supports, and one on each side of the follower-blocks; keys, and a coupler and draw-bar.

37. The combination in a draft and buffing gear, of slotted supports, all of the slots being elongated; a rear follower-block having a hole therethrough; slotted links between the supports and arranged one on each side of the follower-block; a spring or springs in front of the follower-block; a movable key passed through the rear slots in the supports, the follower-block, and the rear slots in the links; a movable key located within the slots of the supports and slots of the links and in front of the spring or springs; and a draw-bar and coupler, the front ends of the links being secured to the draw-bar, and said links being movable relative to the movable key, in front of the spring or springs.

38. The combination in a draft and buffing gear, of a coupler and a draw-bar having a slot; supports having elongated slots; keys within the slots, one of said keys being passed through the slot in the draw-bar; a rear follower-block having a bearing against the rear key; a front follower-block bearing against the end of the draw-bar; means for limiting the forward movement of the front follower-block in drawing; cushioning means between the follower-blocks, and links uniting the keys, said links taking the strains in drawing, and being disconnected from the cushioning means, and each link having an elongated slot where it engages the rear key.

MYERS A. GARRETT.

Witnesses:
M. C. HUTCHINGS,
N. B. MACHATTON.